United States Patent

Yokota et al.

[11] Patent Number: 6,011,958
[45] Date of Patent: Jan. 4, 2000

[54] NO-BATTERY INFORMATION STORAGE MEDIUM CAPABLE OF EFFICIENTLY TRANSMITTING DATA

[75] Inventors: Tsuneshi Yokota, Kawasaki; Kazuki Iwata, Yokohama; Kiyohito Sudo, Kawasaki, all of Japan

[73] Assignee: Kabushiki Kaisha Toshiba, Kawasaki, Japan

[21] Appl. No.: 08/931,844

[22] Filed: Sep. 16, 1997

[30] Foreign Application Priority Data

Sep. 20, 1996 [JP] Japan .................................. 8-250154

[51] Int. Cl.[7] ..................................... H04B 1/38
[52] U.S. Cl. ...................... 455/73; 375/219; 340/825.54; 363/67
[58] Field of Search ........................... 455/572, 41, 38.3, 455/403, 127, 343; 342/51; 340/825.54; 379/FOR 100; 363/65, 67, 69, 70

[56] References Cited

U.S. PATENT DOCUMENTS

| | | |
|---|---|---|
| 4,580,041 | 4/1986 | Walton . |
| 5,847,662 | 12/1998 | Yokota et al. ...................... 340/825.54 |
| 5,862,174 | 1/1999 | Yokota et al. ........................... 375/219 |

FOREIGN PATENT DOCUMENTS 0 461 878  12/1991  European Pat. Off. .

Primary Examiner—Dwayne D. Bost
Assistant Examiner—Erika A. Gary
Attorney, Agent, or Firm—Pillsbury Madison & Sutro LLP

[57] ABSTRACT

A no-battery information storage medium has a radio communication function of receiving power while receiving an externally transmitted radio wave as modulated data, and transmitting data outside the medium. One transmission/reception antenna coil performs transmission/reception. A first full-wave rectifying circuit is constituted by four rectifying elements connected to each other by bridging connection and connected to the two terminals of the transmission/reception antenna coil. A second full-wave rectifying circuit is constituted by four rectifying elements, including two shared rectifying elements of the four rectifying elements constituting the first full-wave rectifying circuit, connected to each other by bridging connection and connected to the two terminals of the transmission/reception antenna coil. A power generating section is connected to the output of the first full-wave rectifying circuit to generate power to be used inside the information storage medium. A constant-current driver section is connected to the output of the second full-wave rectifying circuit to perform transmission by extracting a predetermined current from an output from the second full-wave rectifying circuit in accordance with transmission data.

12 Claims, 6 Drawing Sheets

NO-BATTERY INFORMATION STORAGE MEDIUM CAPABLE OF EFFICIENTLY TRANSMITTING DATA

BACKGROUND OF THE INVENTION

The present invention relates to an information storage medium and, more particularly, to a portable no-battery information storage medium having a radio communication function, e.g., a no-battery radio card or a no-battery radio tag.

Recently, a so-called no-battery radio card has been developed and put to practical use as a portable no-battery information storage medium having a radio communication function.

In a radio card system using radio cards of this type, a radio card reader/writer is used to perform radio transmission/reception between radio cards so as to perform predetermined information processing, e.g., transmission of power and transmission/reception of data, with respect to the radio cards.

In such a conventional radio card, a circuit having an arrangement like the one shown in FIG. 7 or 8 is known as a scheme for modulating data and transmitting the modulated data to the radio card reader/writer while receiving power transmitted by radio waves from the radio card reader/writer.

The circuit shown in FIG. 7 will be described. Reference numeral 1 denotes the transmission/reception antenna coil of a radio card.

A capacitor 2 and the AC input terminals of a full-wave rectifying circuit 3 constituted by diodes D1 to D4 connected to each other by bridging connection are connected to the two terminals of the transmission/reception antenna coil 1.

One DC output terminal (negative side) of the full-wave rectifying circuit 3 is grounded, and the other DC output terminal (positive side) is connected to a stabilizing power supply section 5 through a diode 4 with the polarities shown in FIG. 7.

The stabilizing power supply section 5 generates power to be supplied to the respective portions in the radio card.

A smoothing capacitor 6 is connected between ground and the node of the diode 4 and the stabilizing power supply section 5.

The collector of an npn transistor 7 is connected to the node of the full-wave rectifying circuit 3 and the diode 4.

The emitter of the npn transistor 7 is grounded through a resistor 8. Transmission data is input to the base of the transistor 7.

The circuit shown in FIG. 8 will be described below. Reference numeral 1 denotes the transmission/reception antenna coil of a radio card.

A capacitor 2 and the AC input terminals of a full-wave rectifying circuit 3 constituted by diodes D1 to D4 connected to each other by bridging connection are connected to the two terminals of the transmission/reception antenna coil 1.

One DC output terminal (negative side) of the full-wave rectifying circuit 3 is grounded, and the other DC output terminal (positive side) is connected to a stabilizing power supply section 5.

The stabilizing power supply section 5 generates power to be supplied to the respective portions in the radio card.

A smoothing capacitor 6 is connected between ground and the node of the diode 4 and the stabilizing power supply section 5.

A series circuit of a resistor 9 and a transistor (FET) 10 is connected to the two terminals of the transmission/reception antenna coil 1.

Transmission data is input to the gate of the transistor 10.

In the circuit scheme in FIG. 7, transmission data is input to the node of the full-wave rectifying circuit 3 and the diode 4 through the npn transistor 7 to perform transmission.

In this case, however, when a radio wave is received and rectified by the transmission/reception antenna coil 1 and smoothed by the capacitor 6, and a power supply voltage is obtained from the radio wave by the stabilizing power supply section 5, a voltage drop (0.7V or higher), i.e., a voltage loss, occurs in the diode 4.

When the respective portions in the radio card are to be operated at 3V or lower, about 2V, this voltage drop in the diode 4 cannot be neglected.

The power transmitted from the radio card reader/writer must be increased by the amount corresponding to this voltage drop loss. Such an increase in power is not desirable when power transmission is performed by using weak radio waves without requiring any license based on the Radio Law.

In the circuit scheme in FIG. 8, the transistor 10 is turned on/off in accordance with transmission data to apply load variations to the transmission/reception antenna coil 1 through the resistor 9, thereby performing transmission.

In this case, however, since transmission is performed while radio waves required to generate power are received from the radio card reader/writer, a voltage having an amplitude twice or more that of a rectifying power output from the full-wave rectifying circuit 3 is applied between the two terminals of the transistor 10, posing a problem in the formation of a one-chip IC or the like in terms of breakdown voltage.

Furthermore, in the circuit scheme in FIG. 8, since positive and negative voltages with respect to the reference potential (ground potential) of generated power are applied to the switching transistor 10, a switching operation is difficult to perform.

BRIEF SUMMARY OF THE INVENTION

It is, therefore, an object of the present invention to provide a no-battery information storage medium having a radio communication function of capable of efficiently generating power to be used inside from received radio waves, and efficiently transmitting data while sharing some rectifying elements of a full-wave rectifying circuit.

According to an aspect of the present invention, there is provided a no-battery information storage medium having a radio communication function of receiving power while receiving an externally transmitted radio wave as modulated data, and transmitting data outside the information storage medium, comprising:

one transmission/reception antenna coil for performing transmission/reception;

a first full-wave rectifying circuit constituted by four rectifying elements connected to each other by bridging connection and connected to two terminals of the transmission/reception antenna coil;

a second full-wave rectifying circuit constituted by four rectifying elements, including two shared rectifying elements of the four rectifying elements constituting the first full-wave rectifying circuit, connected to each other by bridging connection and connected to the two terminals of the transmission/reception antenna coil;

power generating means, connected to an output of the first full-wave rectifying circuit, for generating power to be used inside the information storage medium; and constant-current driver means, connected to an output of the second full-wave rectifying circuit, for performing transmission by extracting a predetermined current from an output from the second full-wave rectifying circuit in accordance with transmission data.

According to another aspect of the present invention, there is provided a no-battery information storage medium having a radio communication function of receiving power while receiving an externally transmitted radio wave as modulated data, and transmitting data outside the information storage medium, comprising:

one transmission/reception antenna coil for performing transmission/reception;

a first full-wave rectifying circuit constituted by four rectifying elements connected to each other by bridging connection and connected to two terminals of the transmission/reception antenna coil;

a second full-wave rectifying circuit constituted by four rectifying elements, including two shared rectifying elements of the four rectifying elements constituting the first full-wave rectifying circuit, connected to each other by bridging connection and connected to the two terminals of the transmission/reception antenna coil;

power generating means, connected to an output of the first full-wave rectifying circuit, for generating power to be used inside the information storage medium; and switching means which is connected to an output of the second full-wave rectifying circuit and turned on/off in accordance with transmission data to change a current in the transmission/reception antenna coil in accordance with the transmission data, thereby transmitting the data.

According to still another aspect of the present invention, there is provided a no-battery information storage medium having a radio communication function of receiving power while receiving an externally transmitted radio wave as modulated data, and transmitting data outside the information storage medium, comprising:

first and second transmission/reception antenna coils for performing transmission/reception;

a first full-wave rectifying circuit constituted by four rectifying elements connected to each other by bridging connection and connected to two terminals of the transmission/reception antenna coil;

a second full-wave rectifying circuit constituted by four rectifying elements, including two shared rectifying elements of the four rectifying elements constituting the first full-wave rectifying circuit, connected to each other by bridging connection and connected to the two terminals of the transmission/reception antenna coil;

a third full-wave rectifying circuit constituted by four rectifying element connected to each other by bridging connection and connected to two terminals of the second transmission/reception antenna coil;

a fourth full-wave rectifying circuit constituted by four rectifying elements, including two shared rectifying elements of the third rectifying elements constituting the first full-wave rectifying circuit, connected to each other by bridging connection and connected to the two terminals of the second transmission/reception antenna coil;

power generating means, connected to outputs of the first and third full-wave rectifying circuits, for generating power to be used inside the information storage medium; and first and second constant-current driver means, connected to outputs of the second and fourth full-wave rectifying circuits, for performing transmission by extracting predetermined currents from outputs from the second and fourth full-wave rectifying circuits in accordance with identical transmission data.

According to further still another aspect of the present invention, there is provided a no-battery information storage medium having a radio communication function of receiving power while receiving an externally transmitted radio wave as modulated data, and transmitting data outside the information storage medium, comprising:

first and second transmission/reception antenna coils for performing transmission/reception;

a first full-wave rectifying circuit constituted by four rectifying elements connected to each other by bridging connection and connected to two terminals of the transmission/reception antenna coil;

a second full-wave rectifying circuit constituted by four rectifying elements, including two shared rectifying elements of the four rectifying elements constituting the first full-wave rectifying circuit, connected to each other by bridging connection and connected to the two terminals of the transmission/reception antenna coil;

a third full-wave rectifying circuit constituted by four rectifying element connected to each other by bridging connection and connected to two terminals of the second transmission/reception antenna coil;

a fourth full-wave rectifying circuit constituted by four rectifying elements, including two shared rectifying elements of the third rectifying elements constituting the first full-wave rectifying circuit, connected to each other by bridging connection and connected to the two terminals of the second transmission/reception antenna coil;

power generating means, connected to outputs of the first and third full-wave rectifying circuits, for generating power to be used inside the information storage medium; and first and second switching means which are respectively connected to outputs of the second and fourth full-wave rectifying circuits and turned on/off in accordance with identical transmission data to change currents in the first and second transmission/reception antenna coils in accordance with the transmission data, thereby transmitting the data.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention and, together with the general description given above and the detailed description of the preferred embodiments given below, serve to explain the principles of the invention.

DETAILED DESCRIPTION OF THE INVENTION

Figure 1:
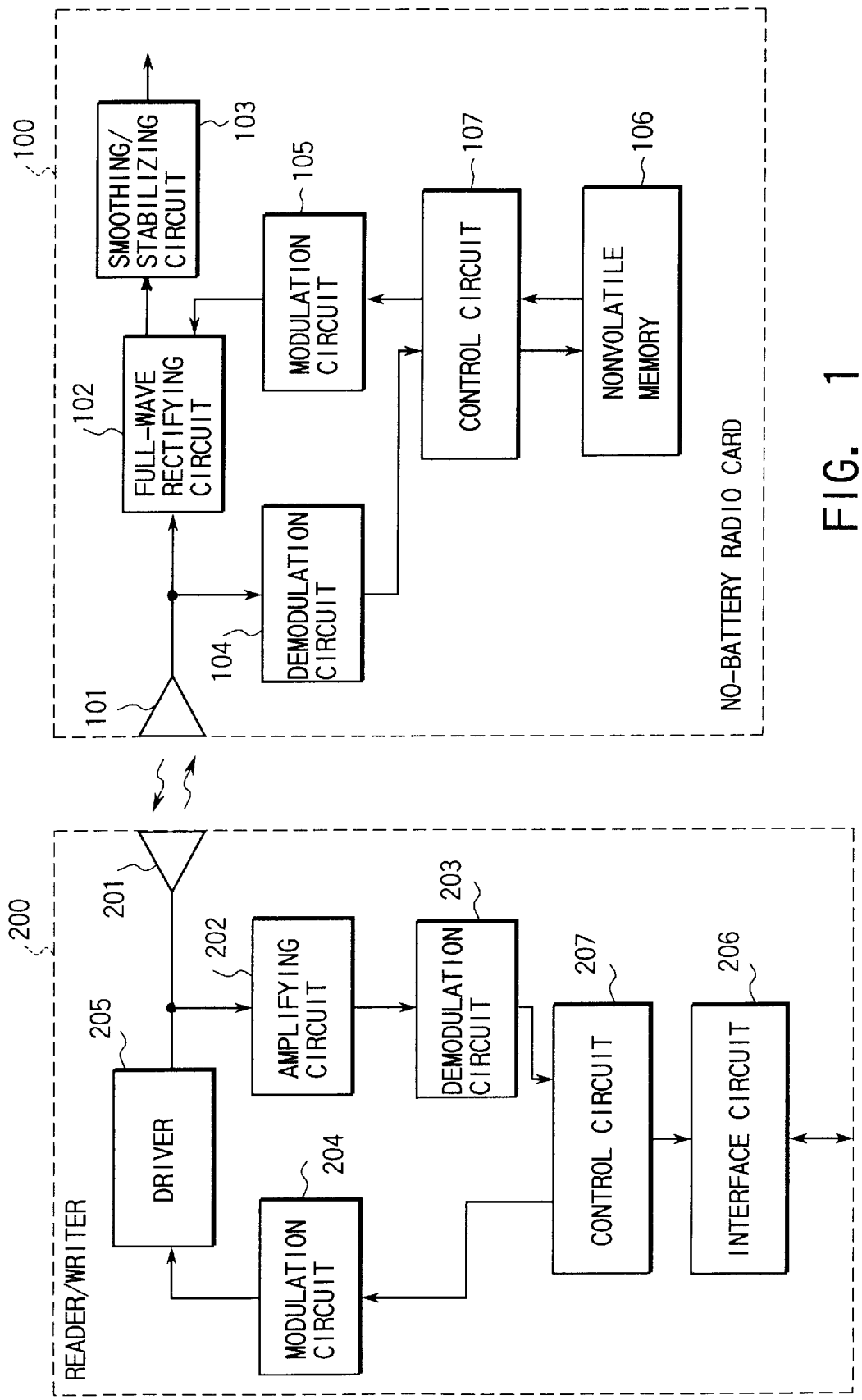
FIG. 1 is a block diagram showing the arrangement of a radio card system to which a radio card as an information storage medium according to an embodiment of the present invention is applied.

Reference will now be made in detail to the presently preferred embodiments of the invention as illustrated in the accompanying drawings, in which like reference characters designate like or corresponding parts throughout the several drawings.

The embodiments of the present invention will be described below with reference to the accompanying drawing.

FIG. 1 shows the arrangement of a radio card system to which a radio card as an information storage medium according to the present invention is applied.

This radio card system can be roughly divided into a portable no-battery radio card 100 having a radio communication function and a radio card reader/writer 200 serving as an information processing apparatus.

The radio card 100 is designed to decode commands from the radio card reader/writer 200 and write/transmit data. The radio card 100 includes a loop transmission/reception antenna 101, a full-wave rectifying circuit 102, a smoothing/stabilizing circuit 103 serving as a power generating means, a demodulation circuit 104, a modulation circuit 105, a nonvolatile memory 106 serving as a storage means, and a control circuit 107 constituted by a CPU and the like and designed to control these components.

The radio card reader/writer 200 is designed to transmit read and write commands to the radio card 100, process read data, and transmit write data. The radio card reader/writer 200 includes a transmission/reception antenna coil 201, an amplifying circuit 202, a demodulation circuit 203, a modulation circuit 204, a driver 205, an interface circuit 206, and a control circuit 207 constituted by a CPU and the like and designed to control these components.

The operation of reading data from the radio card 100 in this arrangement will be described first.

The control circuit 207 of the radio card reader/writer 200 generates a read command, and sends it to the modulation circuit 204.

The modulation circuit 204 modulates the read command according to an arbitrary modulation scheme, and sends the modulated data to the driver 205.

The driver 205 amplifies the modulated data to the degree to which the data can be radiated into space, and then sends the data as a modulated wave to the transmission/reception antenna coil 201, together with a power signal for generating power in the radio card.

The modulated wave radiated from the transmission/reception antenna coil 201 into space is received by the transmission/reception antenna 101 of the radio card 100. The received wave is sent to the full-wave rectifying circuit 102.

The full-wave rectifying circuit 102 rectifies the received modulated wave, and sends the rectified output to the smoothing/stabilizing circuit 103.

The smoothing/stabilizing circuit 103 smoothes the output from the full-wave rectifying circuit 102 to generate a stabilized DC voltage, and applies the voltage as operation power to the respective circuits in the radio card 100.

Meanwhile, the demodulation circuit 104 demodulates the modulated data from the demodulated wave received through the transmission/reception antenna 101, and sends the demodulated data to the control circuit 107.

The control circuit 107 performs command analysis on the basis of the demodulated data. Upon decoding the contents of the command as a read command, the control circuit 107 reads out predetermined data from the nonvolatile memory 106 in which data is stored, and sends the readout data as transmission data to the modulation circuit 105.

The modulation circuit 105 modulates the transmission data, and supplies the modulated data to the transmission/reception antenna 101 through the full-wave rectifying circuit 102.

The modulated wave as the transmission data radiated from the transmission/reception antenna 101 into space is received by the transmission/reception antenna coil 201 of the radio card reader/writer 200.

The signal received through the transmission/reception antenna coil 201 is amplified by the amplifying circuit 202. The amplified signal is sent to the demodulation circuit 203 to be demodulated.

The demodulated data is sent to the control circuit 207 to be subjected to necessary processing (e.g., checking whether the data is properly received, and checking the presence/absence of errors). Thereafter, the data is output outside through the interface circuit 206, as needed.

The operation of writing data in the radio card 100 will be described next.

The control circuit 207 of the radio card reader/writer 200 generates a write command and write data, and sends them to the modulation circuit 204.

The modulation circuit 204 modulates the write command and the write data according to an arbitrary modulation scheme, and sends the modulated data to the driver 205.

The driver 205 amplifies the modulated data to the degree to which the data can be radiated into space, and then sends the amplified data as a modulated wave to the transmission/reception antenna coil 201, together with a power signal for generating power in the radio card 100.

The modulated wave radiated from the transmission/reception antenna coil 201 into space is received by the transmission/reception antenna 101 of the radio card 100.

The full-wave rectifying circuit 102 rectifies the modulated wave received through the transmission/reception antenna 101, and sends the rectified output to the smoothing/stabilizing circuit 103.

The smoothing/stabilizing circuit 103 rectifies the output from the full-wave rectifying circuit 102 to generate a stabilized DC voltage, and applies it as operation power to the respective circuits in the radio card 100.

Meanwhile, the demodulation circuit 104 demodulates the modulated data from the modulated wave received through the transmission/reception antenna 101, and sends the demodulated data to the control circuit 107.

The control circuit 107 performs command analysis on the basis of the demodulated data. Upon decoding the contents of the command as a write command, the control circuit 107 writes the write data, which is sent after the write command, at a predetermined address in the nonvolatile memory 106.

A portion, of the radio card 100, which is the main part of the present invention and corresponds to the full-wave rectifying circuit 102 and the modulation circuit 105 will be described in detail next.

The first embodiment of the present invention will be described first with reference to FIG. 2.

Figure 2:
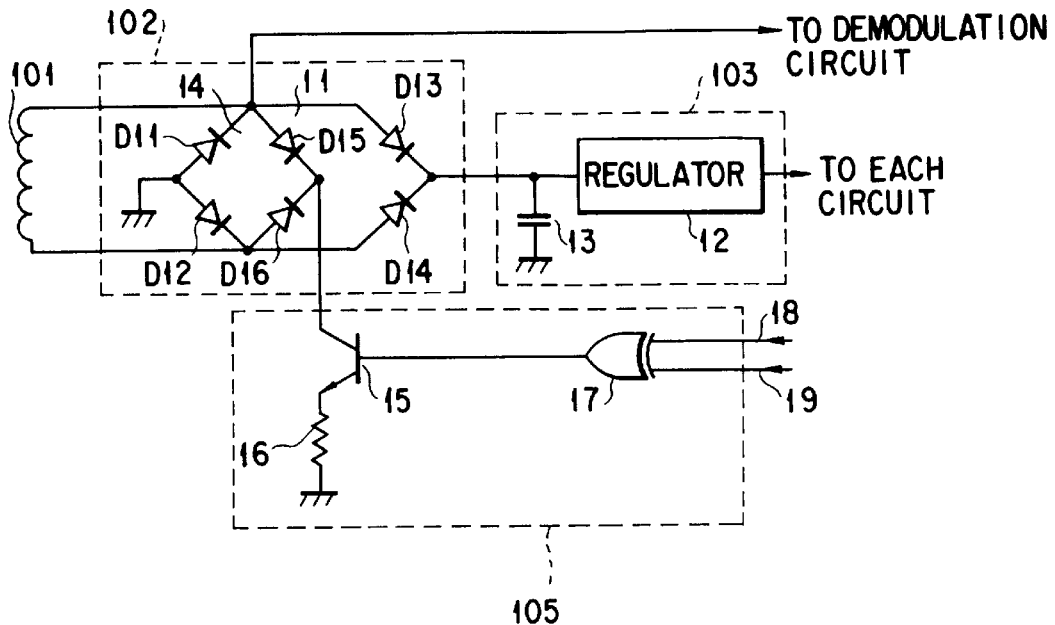
FIG. 2 is a circuit diagram showing a portion, of the radio card of the first embodiment, which corresponds to a full-wave rectifying circuit and a modulation circuit.

Referring to FIG. 2, the AC input terminals of a first full-wave rectifying circuit 11 constituted by diodes D11, D12, D13, and D14 as rectifying elements connected to each other by bridging connection are connected to the two terminals of the transmission/reception antenna 101.

One DC output terminal (negative side) of the first full-wave rectifying circuit 11 is grounded, and the other DC output terminal (positive side) is connected to the input terminal of a regulator 12 as a part of the smoothing/stabilizing circuit 103.

A smoothing capacitor 13 is connected between ground and the node of the first full-wave rectifying circuit 11 and the regulator 12.

The AC input terminals of a second full-wave rectifying circuit 14 are connected to the two terminals of the transmission/reception antenna 101. The second full-wave rectifying circuit 14 is formed by connecting additional diodes D15 and D16 and two shared diodes of the second full-wave rectifying circuit 14 constituting the first full-wave rectifying circuit 11, i.e., the two diodes D11 and D12 whose anodes are commonly connected and grounded, to each other by bridging connection.

In this case, the first and second full-wave rectifying circuits 11 and 14 constitute the full-wave rectifying circuit 102 in FIG. 1.

The collector of an npn transistor 15 as a part of a constant-current driver means is connected to the other DC output terminal (positive side) of the second full-wave rectifying circuit 14.

The emitter of the npn transistor 15 is grounded through a resistor 16.

An output from an exclusive OR circuit 17 is input to the base of this transistor 15.

Transmission data 18 supplied from the control circuit 107 in FIG. 1 and a subcarrier 19 obtained by frequency-dividing a received carrier (carrier frequency) to one nth (n is an integer) are input to the respective input terminals of the exclusive OR circuit 17.

In this case, the transistor 15, the resistor 16, and the exclusive OR circuit 17 constitute the modulation circuit 105 in FIG. 1.

In this arrangement, a modulated wave received through the transmission/reception antenna 101 is rectified by the first full-wave rectifying circuit 11 constituted by the diodes D11, D12, D13, and D14. The rectified output is sent to the smoothing/stabilizing circuit 103 constituted by the regulator 12 and the capacitor 13.

The smoothing/stabilizing circuit 103 smoothes the output from the first full-wave rectifying circuit 11 to generate a stabilized DC voltage, and applies it as operation power to the respective circuits in the radio card 100.

The transmission data 18 supplied from the control circuit 107 is input to the exclusive OR circuit 17, together with the subcarrier 19 obtained by, for example, frequency-dividing a carrier (carrier frequency) received through the transmission/reception antenna 101 to one nth (n is an integer). As a result, the transmission data 18 is two-phase-modulated and input to the base of the transistor 15.

Since the transistor 15 is a part of the constant-current drive circuit, when a constant current corresponding to the two-phase-modulated transmission data is extracted from the output from the second full-wave rectifying circuit 14 constituted by the additional diodes D11, D12, D15, and D16, the antenna current in the transmission/reception antenna 101 is changed in accordance with the transmission data. With this operation, the data is transmitted.

The second embodiment of the present invention will be described next with reference to FIG. 3.

The second embodiment differs from the first embodiment only in the arrangement of a modulation circuit 105. For this reason, the same reference numerals denote the same parts in these embodiments, and a description thereof will be omitted.

Figure 3:
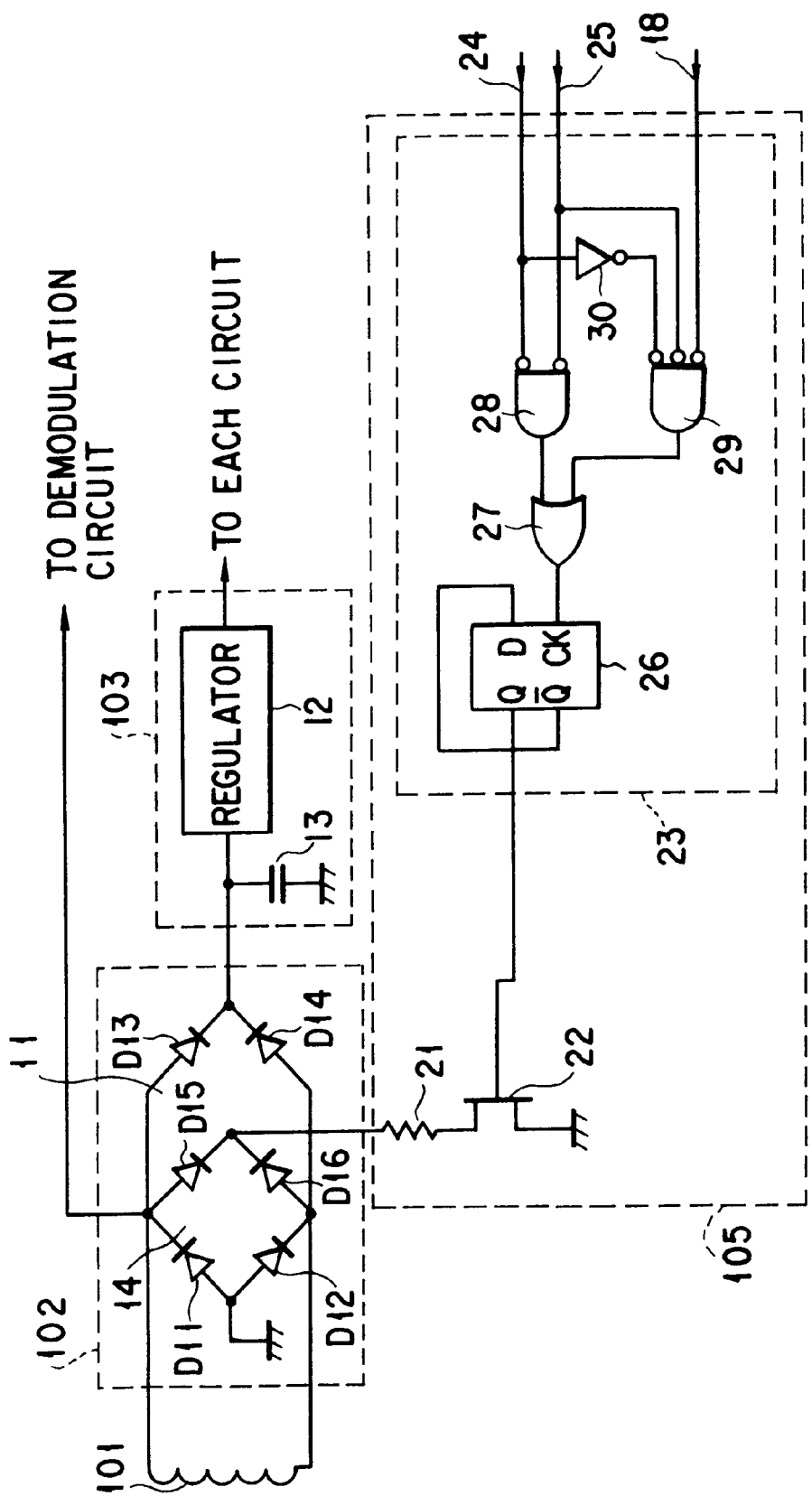
FIG. 3 is a circuit diagram showing a portion, of a radio card of the second embodiment, which corresponds to a full-wave rectifying circuit and a modulation circuit.

Referring to FIG. 3, the drain of a transistor (FET) 22 is connected to the other DC output terminal (positive side) of a second full-wave rectifying circuit 14 through a resistor 21.

The source of the transistor 22 is grounded.

An output from a coding circuit 23 is input to the gate of the transistor 22.

The resistor 21 and the transistor 22 constitute a switching means.

For example, the coding circuit 23 is a conventional biphase coding circuit constituted by a D-type flip-flop circuit 26, an OR circuit 27, NOR circuits 28 and 29, an inverter circuit 30, and the like. The coding circuit 23 receives transmission data 18, a first clock pulse 24, and a second clock pulse 25 having a frequency twice that of the first clock pulse 24.

In this arrangement, a full-wave rectifying circuit 102 and a smoothing/stabilizing circuit 103 operate in the same manner as in the first embodiment. The operation of the modulation circuit 105 will therefore be described below.

The transmission data 18 supplied from a control circuit 107 is coded by the coding circuit 23 and supplied to the gate of the transistor 22.

In accordance with this coded transmission data, the transistor 22 is turned on/off, thus performing a switching operation.

With this switching operation of the transistor 22, the current in a transmission/reception antenna 101 is changed in accordance with the coded transmission data through the second full-wave rectifying circuit 14, thereby transmitting the data.

In this case, as described above, the switching means is constituted by the transistor 22, which is turned on/off in accordance with the transmission data, and the resistor 21 series-connected to the transistor 22. The modulated current in the transmission/reception antenna 101, which is modulated by the transmission data, is substantially determined by the value of the resistor 21 series-connected to the transistor 22 of the switching means.

FIGS. 4A to 4H show examples of operation waveforms at the main portions of the coding circuit 23.

Figure 4A:
FIGS. 4A to 4H are timing charts showing examples of operation waveforms at the main portions in a coding circuit in the second embodiment.
Figure 4B:
Figure 4C:
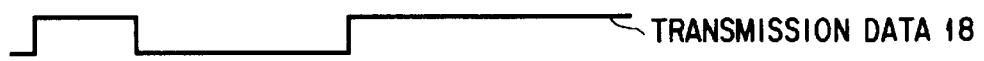
Figure 4D:
Figure 4E:
Figure 4F:
Figure 4G:
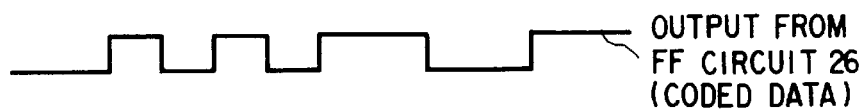

FIGS. 4A to 4C respectively show the waveforms of the first clock pulse 24, the second clock pulse 25, and the transmission data 18.

FIGS. 4D to 4G respectively show the waveforms of outputs from the NOR circuits 28 and 29, the OR circuit 27, and the D-type flip-flop circuit 26.

Figure 4H:
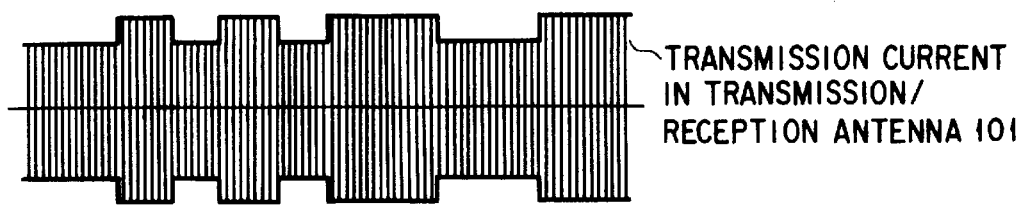

FIG. 4H shows the waveform of a transmission current in the transmission/reception antenna 101.

The third embodiment of the present invention will be described next with reference to FIG. 5.

The third embodiment differs from the first embodiment in that two pairs of transmission/reception antenna coils are used. For this reason, the same reference numerals in the third embodiment denote the same parts as in the first embodiment, and a description thereof will be omitted.

Recently, efforts have been made to standardize proximity type contactless IC cards complying with ISO standards. A scheme for realizing contactless IC cards has been proposed, in which two pairs of transmission/reception antenna coils 101a, 101b, 201a, and 201b are used, as shown in FIG. 5, to transmit power from a reader/writer 200A to a (radio) IC card 100A and transmit/receive data therebetween by magnetic coupling.

According to this embodiment, therefore, there is provided the (radio) IC card 100A which is designed to generate power and transmit data and can be suitably applied to the scheme using two pairs of transmission/reception antenna coils.

Figure 5:
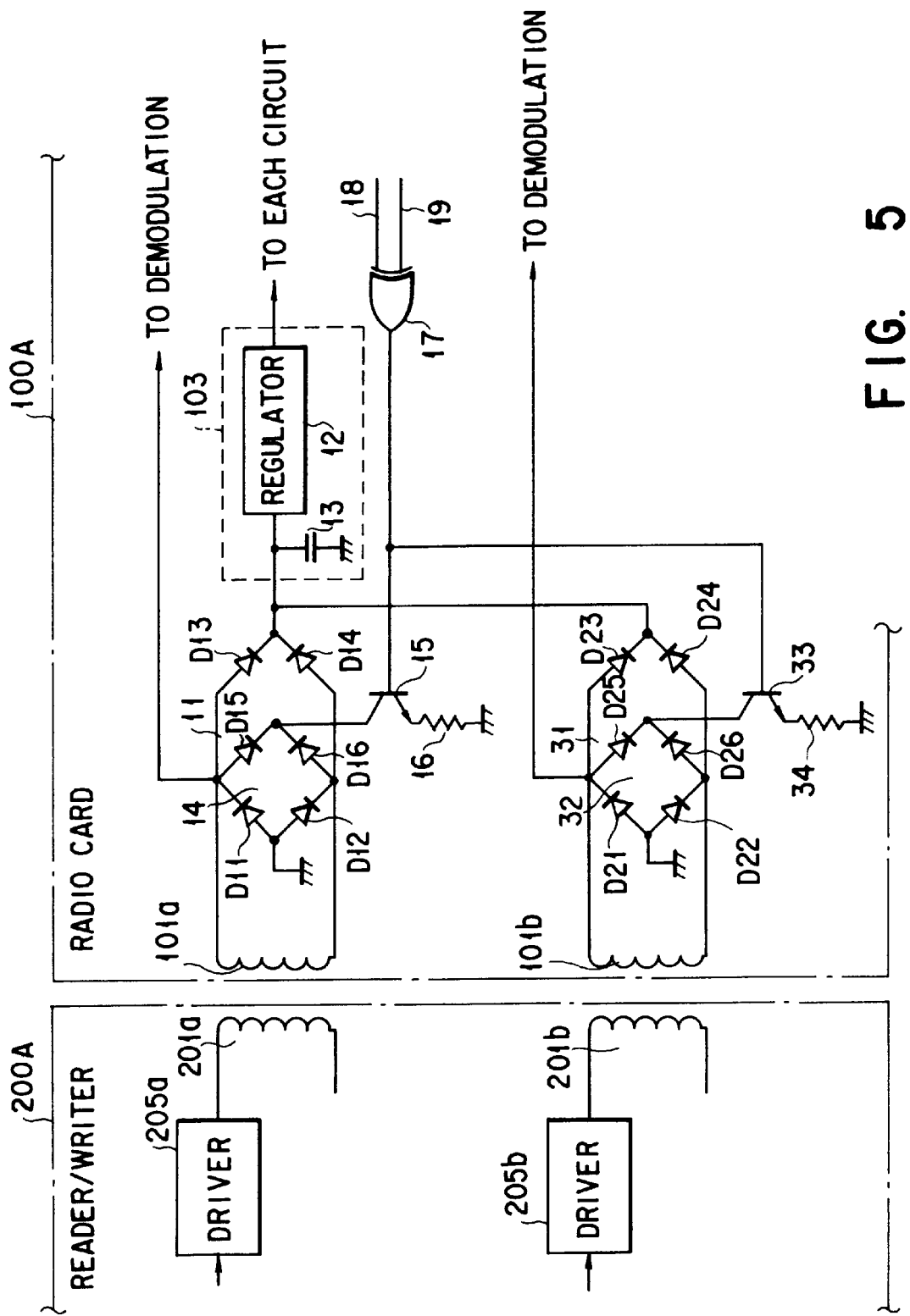
FIG. 5 is a circuit diagram showing a portion, of a radio card of the third embodiment, which corresponds to a full-wave rectifying circuit and a modulation circuit.

Referring to FIG. 5, the first and second transmission/reception antenna coils 201a and 201b of the reader/writer 200A are respectively connected to first and second drivers 205a and 205b and arranged according to a predetermined two-dimensional positional relationship.

The same arrangement as that in the first embodiment shown in FIG. 2 is connected to the two terminals of the first transmission/reception antenna coil 101a.

Similar to the first transmission/reception antenna coil 101a, the AC input terminals of a third full-wave rectifying circuit 31 constituted by diodes D21, D22, D23, and D24 as rectifying elements connected to each other by bridging connection are connected to the two terminals of the second transmission/reception antenna coil 101b.

One DC output terminal (negative side) of the third full-wave rectifying circuit 31 is grounded, and the other DC output terminal (positive side) is connected to the node of the first full-wave rectifying circuit 11 and a regulator 12.

The AC input terminals of a fourth full-wave rectifying circuit 32 are connected to the two terminals of the second transmission/reception antenna coil 101b. The fourth full-wave rectifying circuit 32 is formed by connecting two additional diodes D25 and D26 and two shared diodes of the diodes constituting the third full-wave rectifying circuit 31, i.e., the two diodes D21 and D22 whose anodes are commonly connected and grounded, to each other by bridging connection.

The collector of an npn transistor 33 as a part of a constant-current driver means is connected to the other DC output terminal (positive side) of the fourth full-wave rectifying circuit 32.

The emitter of the transistor 33 is grounded through a resistor 34.

An output from an exclusive OR circuit 17 is input to the base of the transistor 33.

In this arrangement, a rectified output from the first full-wave rectifying circuit 11 and a rectified output from the third full-wave rectifying circuit 31 are sent to a smoothing/stabilizing circuit 103 to be processed in the same manner as described above. In addition, this scheme uses two pairs of transmission/reception antenna coils. Therefore, a more stable DC voltage can be generated.

As in the above case, transmission data 18 is input to the exclusive OR circuit 17 to be two-phase modulated, and the modulated data is input to the bases of the transistors 15 and 33.

Since both the transistors 15 and 33 are respectively parts of the constant-current drive circuits, when constant currents corresponding to the two-phase-modulated transmission data are extracted from outputs from a second full-wave rectifying circuit 14 constituted by additional diodes D11, D12, D15, and D16 and the fourth full-wave rectifying circuit 32 constituted by diodes D21, D22, D25, and D26, the antenna currents in the first and second transmission/reception antenna coils 101a and 101b are changed in accordance with the transmission data. With this operation, the data is transmitted.

The fourth embodiment of the present invention will be described next with reference to FIG. 6.

Similar to the third embodiment, the fourth embodiment differs from the second embodiment in that two pairs of transmission/reception antenna coils are used. For this reason, the same reference numerals in the fourth embodiment denote the same parts as in the second and third embodiments, and a description thereof will be omitted.

Figure 6:
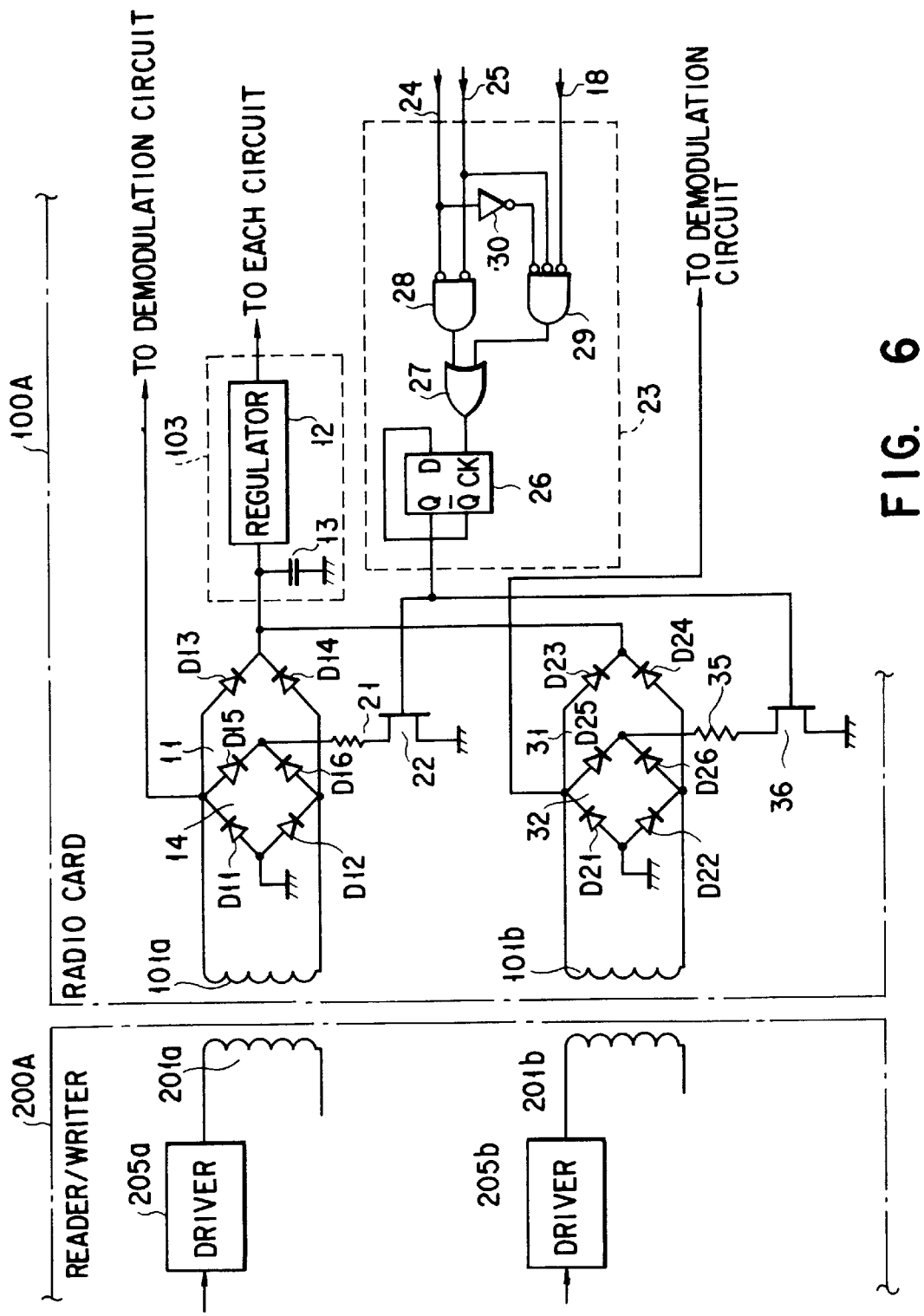
FIG. 6 is a circuit diagram showing a portion, of a radio card of the fourth embodiment, which corresponds to a full-wave rectifying circuit and a modulation circuit.

Referring to FIG. 6, the drain of a transistor (FET) 36 is connected to the other DC output terminal (positive side) of a fourth full-wave rectifying circuit 32 through a resistor 35. The source of the transistor 36 is grounded. An output from a coding circuit 23 is input to the gate of the transistor 36.

In this arrangement, transmission data 18 is coded by the coding circuit 23 and supplied to the gates of resistors 22 and 36.

With this operation, the transistors 22 and 36 are simultaneously turned on/off in accordance with the coded transmission data, thus performing switching operations.

With the switching operations of the transistors 22 and 36, currents in first and second transmission/reception antenna coils 101a and 101b are changed in accordance with the coded transmission data through second and fourth full-wave rectifying circuits 14 and 32, thereby transmitting the data.

As has been described above, according to the above embodiments, the no-battery radio card can efficiently generate internal power from received radio waves, and can efficiently transmit data while sharing some diodes of the full-wave rectifying circuit.

In addition, since the data transmission method is independent of the power generating means, data can be transmitted without being influenced by the capacity of the smoothing capacitor and the amount of current consumed.

Figure 7:
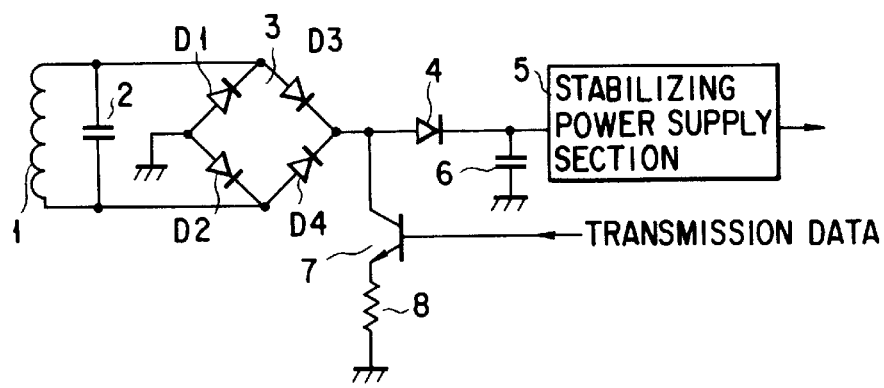
FIG. 7 is a circuit diagram showing a portion, of a conventional radio card, which corresponds to a full-wave rectifying circuit and a modulation circuit.

In the prior art shown in FIG. 7, although transmission can be efficiently performed, a serious problem is posed in terms of the voltage drop loss of received power which is caused by the diode 4. The above embodiments can solve this problem.

Figure 8:
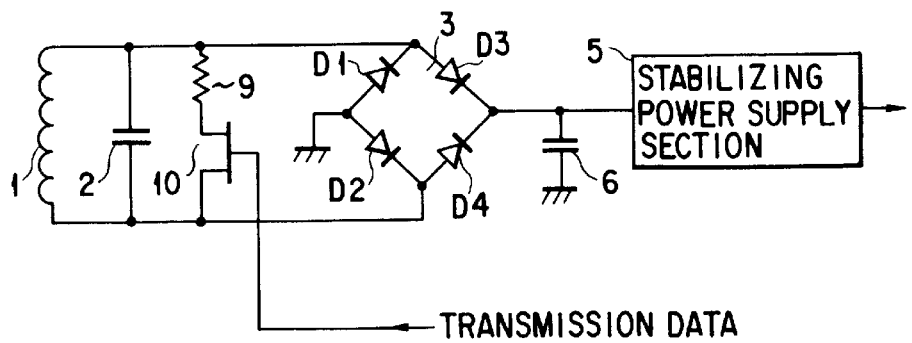
FIG. 8 is a circuit diagram showing a portion, of another conventional radio card, which corresponds to a full-wave rectifying circuit and a modulation circuit.

In the prior art shown in FIG. 8, a voltage having an amplitude twice or more that of a rectified output voltage is applied between the two terminals of the transistor 10 for transmission, a problem is posed in the formation of an IC. The data transmission circuit of each embodiment described above can also solve this problem.

On the no-battery radio card side, data with a relatively low degree of modulation is transmitted while radio waves are received to generate power. The data can be properly received and demodulated on the reader/writer side by modulating the transmission data into a two-phase-modulated signal on the card side by using a frequency which is one nth (n is an integer) a carrier frequency and obtained by frequency-dividing the carrier frequency by at least ⅛ in synchronism with the received radio wave.

In each embodiment described above, as shown in FIGS. 4A to 4G, transmission data as an NRZ (nonreturn to zero) signal is subjected to differential biphase coding to allow proper reception and demodulation of even transmission data with a low degree of modulation on the reader/writer side.

If identical transmission data are transmitted from the first and second transmission/reception antenna coils, the data can be stably received on the radio card reader/writer side by providing a reception amplifying circuit and a demodulation circuit for one of the opposing two transmission (reception) antenna coils on the radio card reader/writer side.

In addition, according to each embodiment described above, since the full-wave rectifying circuit for generating power and the full-wave rectifying circuit for transmitting data are not separately arranged, but share some components, the circuits can be greatly simplified.

Each embodiment described above is characterized in that the switching means included in the transmission control means is constituted by the transistor which is turned on/off in accordance with transmission data, and the resistive element series-connected to the transistor, and the modulated current based on the transmission data and flowing in the transmission/reception antenna coil is substantially determined by the value of the resistive element series-connected to the transistor of the switching means.

As has been described in detail above, according to the present invention, there is provided a no-battery information storage medium having a radio communication function of capable of efficiently generating internal power from received radio waves, and efficiently transmitting data while sharing some rectifying elements of a full-wave rectifying circuit.

Additional embodiments of the present invention will be apparent to those skilled in the art from consideration of the specification and practice of the present invention disclosed herein. It is intended that the specification and examples be considered as exemplary only, with the true scope of the present invention being indicated by the following claims.

I claim:

1. A no-battery information storage medium having a radio communication function of receiving power while receiving an externally transmitted radio wave as modulated data, and transmitting data outside said information storage medium, comprising:

one transmission/reception antenna coil for performing transmission/reception;

a first full-wave rectifying circuit constituted by four rectifying elements connected to each other by bridging connection and connected to two terminals of said transmission/reception antenna coil;

a second full-wave rectifying circuit constituted by four rectifying elements, including two shared rectifying elements of said four rectifying elements constituting said first full-wave rectifying circuit, connected to each other by bridging connection and connected to the two terminals of said transmission/reception antenna coil;

power generating means, connected to an output of said first full-wave rectifying circuit, for generating power to be used inside said information storage medium; and constant-current driver means, connected to an output of said second full-wave rectifying circuit, for performing transmission by extracting a predetermined current from an output of said second full-wave rectifying circuit in accordance with transmission data.

2. A medium according to claim 1, wherein the transmission data is two-phase-modulated by using a frequency which is one nth (n is an integer) a carrier frequency of a reception radio wave received through said transmission/reception antenna coil and obtained by frequency-dividing the carrier frequency by at least ⅛ in synchronism with the reception radio wave, and is transmitted from said transmission/reception antenna coil through said constant-current driver means.

3. A medium according to claim 1, wherein the transmission data is transmitted from said transmission/reception antenna coil through said constant-current driver means after predetermined coding of the data is performed.

4. A medium according to claim 1, wherein said two rectifying elements, of said first full-wave rectifying circuit, which are shared by said second full-wave rectifying circuit are two rectifying elements each having one electrode commonly connected and grounded.

5. A no-battery information storage medium having a radio communication function of receiving power while receiving an externally transmitted radio wave as modulated data, and transmitting data outside said information storage medium, comprising:

one transmission/reception antenna coil for performing transmission/reception;

a first full-wave rectifying circuit constituted by four rectifying elements connected to each other by bridging connection, having AC input terminals and DC output terminals, said AC input terminals being connected to two terminals of said transmission/reception antenna coil;

a second full-wave rectifying circuit constituted by four rectifying elements, including two shared rectifying elements of said four rectifying elements constituting said first full-wave rectifying circuit, connected to each other by bridging connection, having AC input terminals and DC output terminals, said AC input terminals being connected to the two terminals of said transmission/reception antenna coil;

power generating means, connected to said DC output terminals of said first full-wave rectifying circuit, for generating power to be used inside said information storage medium; and switching means which is connected to said DC output terminals of said second full-wave rectifying circuit and turned on/off in accordance with transmission data to change a current in said transmission/reception antenna coil in accordance with the transmission data, thereby transmitting the data outside said storage medium.

6. A medium according to claim 5, wherein said switching means comprises a transistor which is turned on/off in accordance with the transmission data, and a resistive element series-connected to said transistor, and a modulated current in said transmission/reception antenna coil which is modulated by the transmission data is substantially determined by a value of said resistive element series-connected to said transistor of said switching element.

7. A medium according to claim 5, wherein said two rectifying elements, of said first full-wave rectifying circuit, which are shared by said second full-wave rectifying circuit are two rectifying elements each having one electrode commonly connected and grounded.

8. A no-battery information storage medium having a radio communication function of receiving power while receiving an externally transmitted radio wave as modulated data, and transmitting data outside said information storage medium, comprising:

first and second transmission/reception antenna coils for performing transmission/reception;

a first full-wave rectifying circuit constituted by four rectifying elements connected to each other by bridging connection and connected to two terminals of said first transmission/reception antenna coil;

a second full-wave rectifying circuit constituted by four rectifying elements, including two shared rectifying elements of said four rectifying elements constituting said first full-wave rectifying circuit, connected to each other by bridging connection and connected to the two terminals of said first transmission/reception antenna coil;

a third full-wave rectifying circuit constituted by four rectifying element connected to each other by bridging connection and connected to two terminals of said second transmission/reception antenna coil;

a fourth full-wave rectifying circuit constituted by four rectifying elements, including two shared rectifying elements of said third rectifying elements constituting said first full-wave rectifying circuit, connected to each other by bridging connection and connected to the two terminals of said second transmission/reception antenna coil;

power generating means, connected to outputs of said first and third full-wave rectifying circuits, for generating power to be used inside said information storage medium; and first and second constant-current driver means, connected to outputs of said second and fourth full-wave rectifying circuits, for performing transmission by extracting predetermined currents from outputs of said second and fourth full-wave rectifying circuits in accordance with identical transmission data.

9. A medium according to claim 8, wherein said two rectifying elements, of each of said first and third full-wave rectifying circuits, which are shared by said second and fourth full-wave rectifying circuits are two rectifying elements each having one electrode commonly connected and grounded.

10. A no-battery information storage medium having a radio communication function of receiving power while receiving an externally transmitted radio wave as modulated data, and transmitting data outside said information storage medium, comprising:

first and second transmission/reception antenna coils for performing transmission/reception;

a first full-wave rectifying circuit constituted by four rectifying elements connected to each other by bridging connection and connected to two terminals of said first transmission/reception antenna coil;

a second full-wave rectifying circuit constituted by four rectifying elements, including two shared rectifying elements of said four rectifying elements constituting said first full-wave rectifying circuit, connected to each other by bridging connection and connected to the two terminals of said first transmission/reception antenna coil;

a third full-wave rectifying circuit constituted by four rectifying element connected to each other by bridging connection and connected to two terminals of said second transmission/reception antenna coil;

a fourth full-wave rectifying circuit constituted by four rectifying elements, including two shared rectifying elements of said third rectifying elements constituting said first full-wave rectifying circuit, connected to each other by bridging connection and connected to the two terminals of said second transmission/reception antenna coil;

power generating means, connected to outputs of said first and third full-wave rectifying circuits, for generating power to be used inside said information storage medium; and first and second switching means which are respectively connected to outputs of said second and fourth full-wave rectifying circuits and turned on/off in accordance with identical transmission data to change currents in said first and second transmission/reception antenna coils in accordance with the transmission data, thereby transmitting the data.

11. A medium according to claim 10, wherein said two rectifying elements, of each of said first and third full-wave rectifying circuits, which are shared by said second and fourth full-wave rectifying circuits are two rectifying elements each having one electrode commonly connected and grounded.

12. A no-battery information storage medium having a radio communication function of receiving power while receiving an externally transmitted radio wave as modulated data, and transmitting data outside the information storage medium, comprising:

one transmission/reception antenna coil for performing transmission/reception;

a first full-wave rectifying circuit constituted by four rectifying elements connected to each other by bridging connection and connected to two terminals of the transmission/reception antenna coil;

a second full-wave rectifying circuit constituted by four rectifying elements, including two shared rectifying elements of the four rectifying elements constituting the first full-wave rectifying circuit, connected to each other by bridging connection and connected to the two terminals of the transmission/reception antenna coil;

power generating means, connected to an output of the first full-wave rectifying circuit, for generating power to be used inside the information storage medium; and switching means which is connected to an output of the second full-wave rectifying circuit and turned on/off in accordance with transmission data to change a current in the transmission/reception antenna coil in accordance with the transmission data, thereby transmitting the data;

wherein the switching means comprises a transistor which is turned on/off in accordance with the transmission data, and a resistive element series-connected to the transistor, and a modulated current in the transmission/reception antenna coil which is modulated by the transmission data is substantially determined by a value of the resistive element series-connected to the transistor or the switching element.

* * * * *